(12) United States Patent
Buchanan et al.

(10) Patent No.: US 6,287,367 B1
(45) Date of Patent: Sep. 11, 2001

(54) HIGH-CAPACITY VAPOR/LIQUID CONTACTING DEVICE

(75) Inventors: John Scott Buchanan, Hamilton, NJ (US); Berne Kim Stober, Gainesville, VA (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/461,266

(22) Filed: Dec. 15, 1999

Related U.S. Application Data

(63) Continuation-in-part of application No. 09/080,969, filed on May 19, 1998, now abandoned.

(51) Int. Cl.[7] .................................................... B01F 3/04
(52) U.S. Cl. ........................ 95/198; 95/199; 95/267; 261/75; 261/113; 261/114.1; 261/114.5
(58) Field of Search .......................... 95/198, 199, 200, 95/202, 267; 96/188; 261/75, 112.2, 113, 114.1, 114.5

(56) References Cited

U.S. PATENT DOCUMENTS

| 2,116,933 | * | 5/1938 | Ragatz | 261/113 |
| 2,610,046 | * | 9/1952 | Collins | 261/113 |
| 2,772,748 | | 12/1956 | Manning, Jr. . | |
| 4,226,678 | * | 10/1980 | Kende et al. | 261/114.5 |
| 4,356,132 | * | 10/1982 | Belyakov et al. | 261/114.5 |
| 5,756,055 | * | 5/1998 | Kelly et al. | 261/114.5 |
| 6,076,813 | * | 6/2000 | Yeoman et al. | 261/114.5 |
| 6,095,504 | * | 8/2000 | Heldwein et al. | 261/114.5 |

FOREIGN PATENT DOCUMENTS

WO 99 26718A  6/1999  (WO) .

* cited by examiner

Primary Examiner—David A. Simmons
Assistant Examiner—Minh-Chaut Pham
(74) Attorney, Agent, or Firm—Malcolm D. Keen

(57) ABSTRACT

This concept concerns a vapor/liquid contacting tray which is useful in distillation and related mass transfer or heat transfer applications where liquid flows down and gas or vapor flows up through a vessel. In this device, the perforated area is relatively small, so the liquid is entrained upward. The liquid flow is then directed downward into a large disengaging area. The downward momentum of the liquid and the large disengaging allow for high liquid and vapor rates without overloading the vapor/liquid disengaging capacity of the device.

10 Claims, 5 Drawing Sheets

HIGH-CAPACITY VAPOR/LIQUID CONTACTING DEVICE

CROSS-REFERENCE TO RELATED APPLICATIONS

This application is a continuation-in-part of Ser. No. 09/080,969, filed May 19, 1998 now abandoned.

FIELD OF THE INVENTION

This invention is directed to a series of vapor/liquid contacting trays and a separation process which employs this series of trays. Contacting trays such as the one of this invention are useful in distillation and related mass transfer or heat transfer applications where liquid flows down and gas or vapor flows up through a vessel.

BACKGROUND OF THE INVENTION

Liquid entrainment is a problem frequently encountered in distillation tray technology. Gas-liquid contacting employing plate and tray columns and potential problems involved are discussed in Section 18 of The Chemical Engineers' Handbook, Fifth Edition, by Robert H. Perry and Cecil H. Chilton. Tray designs with baffles and dispersers of various types are illustrated and discussed.

Copending application Ser. No. 08/833,490 (which is commonly owned with the instant invention) is directed to a means of de-entraining liquid. In Ser. No. 08/833,490, a plurality of de-entrainment devices (such as vane packs) on the trays are specified to accomplish the vapor/liquid de-entrainment.

A series of conventional sieve trays is illustrated in FIG. 1. Liquid that is entrained upwards from the tray can be thrown up against the perforated area of the tray above, and get carried up to the next tray. This backmixing of liquid up the column, contrary to the desired downward liquid flow, can greatly decrease the separation efficiency of the column and can cause flooding (hydraulic overloading) of the column.

U.S. Pat. No. 4,356,132 (Belyakov et al) discloses a mass-transfer apparatus which comprises a vertical cylindrical housing, contact trays accomodated inside the housing and made up of perforated and non-perforated sectors, the neighboring trays being arranged so that the perforated sectors of one tray overlie the non-perforated sectors of another tray and vice-versa. The overflow passageways of the contact trays are positioned on the non-perforated sectors. Overflow deflectors are arranged on the contact trays, and baffles are adapted to extend downwardly from each contact tray from the borderline between the perforated and non-perforated sectors and inclined toward the perforated sector. Belyakov differs from the instant invention in that it does not teach the use of multiple baffles vertically located between the perforated area and the impermeable roof, in order to decrease entrainment of liquid. The instant invention imparts co-current flow of both gas and liquid with substantially all the liquid being purposely entrained upward into the vanes (or baffles) where the liquid is deflected downward, at an angle, into a disengaging area opposite the perforated area where the liquid and gas efficiently separate. Belyakov's device specifically does not act in this way as illustrated by Belyakov's Figure's 3 and 6 (see solid and dashed flow lines). Our invention has a rather large sloping open disengaging area extending well below the plane of and opposite the perforated area for enhanced separation of liquid from vapor. Belyakov has no such area extending below the plane of the perforated area.

SUMMARY

In the instant invention, the phase separation can take place in an essentially empty disengagement area by the forces of gravity and liquid downward inertia, without the aid of special de-entrainment devices. Although they are not necessary, mesh pads, vanes, plates, louvers or other means to assist phase separation or other means of assisting phase separation may be placed within the disengagement area.

FIG. 2 illustrates the instant invention. There is an impermeable "roof" directly above the bubbling area (or perforated area) of one tray, so liquid cannot be thrown directly up against the perforated area of the tray above. There is at least one outlet weir (or baffle, or alternately, vane) or other surface projecting up at some angle from the level of the perforated area at or near the exit end of the perforated area, to help direct the froth at least partially upwards initially.

Complete entrainment of the liquid is not necessary in the functioning of this invention. Some liquid can simply spill over the outlet weir. It is preferred, however, to initially impart some upward momentum to the bulk of the liquid. There is at least one baffle that then helps direct the liquid at least partially downward, such that the liquid is moving generally downward, rather than upward, as it enters the disengaging zone where the vapor flows upward to the next tray. One or more curved turning vanes may also be used to direct the liquid momentum downward.

Many FCC units are limited by the downstream gas plant. The trays of the instant invention can help debottleneck gas plants, other high pressure towers, and amine towers with high liquid loads. The capacity benefits of this invention are probably highest at conditions of high liquid flux (greater than about 20 gpm/ft2 of tower area).

DETAILED DESCRIPTION OF THE INVENTION

Figure 1:
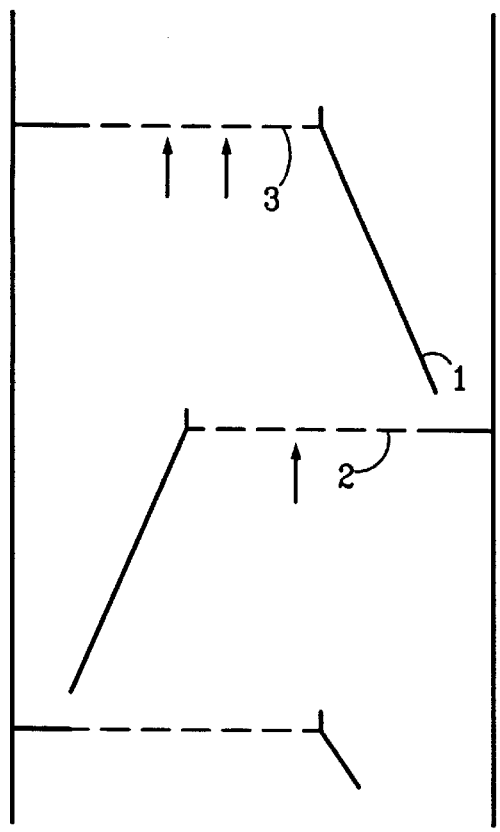
FIG. 1 illustrates a conventional sieve tray. Liquid enters the tray at 1, becomes entrained with the rising vapor 2, and is thrown against the perforated area of the tray 3 above, to be carried to the next tray.
Figure 2:
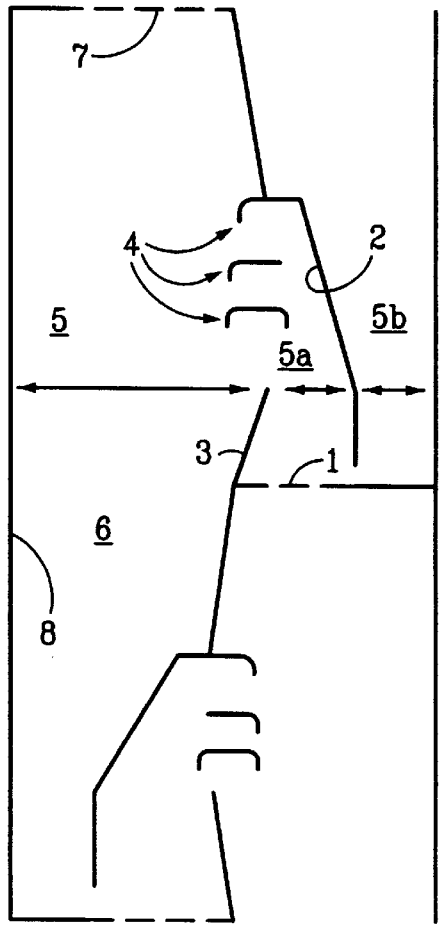
FIG. 2 illustrates the sieve tray of the instant invention in a single pass mode. There is an impermeable roof directly above the bubbling area, which prevents liquid from being thrown directly up against the perforated area of the tray above. There are baffles, not connected to the tray above, that help direct the liquid at least partially downward. These baffles could alternately be described as curved turning vanes, and direct liquid flow downward. There is little or no direct line of sight from the perforated area of one tray to the perforated area of the next tray in sequence.
Figure 3:
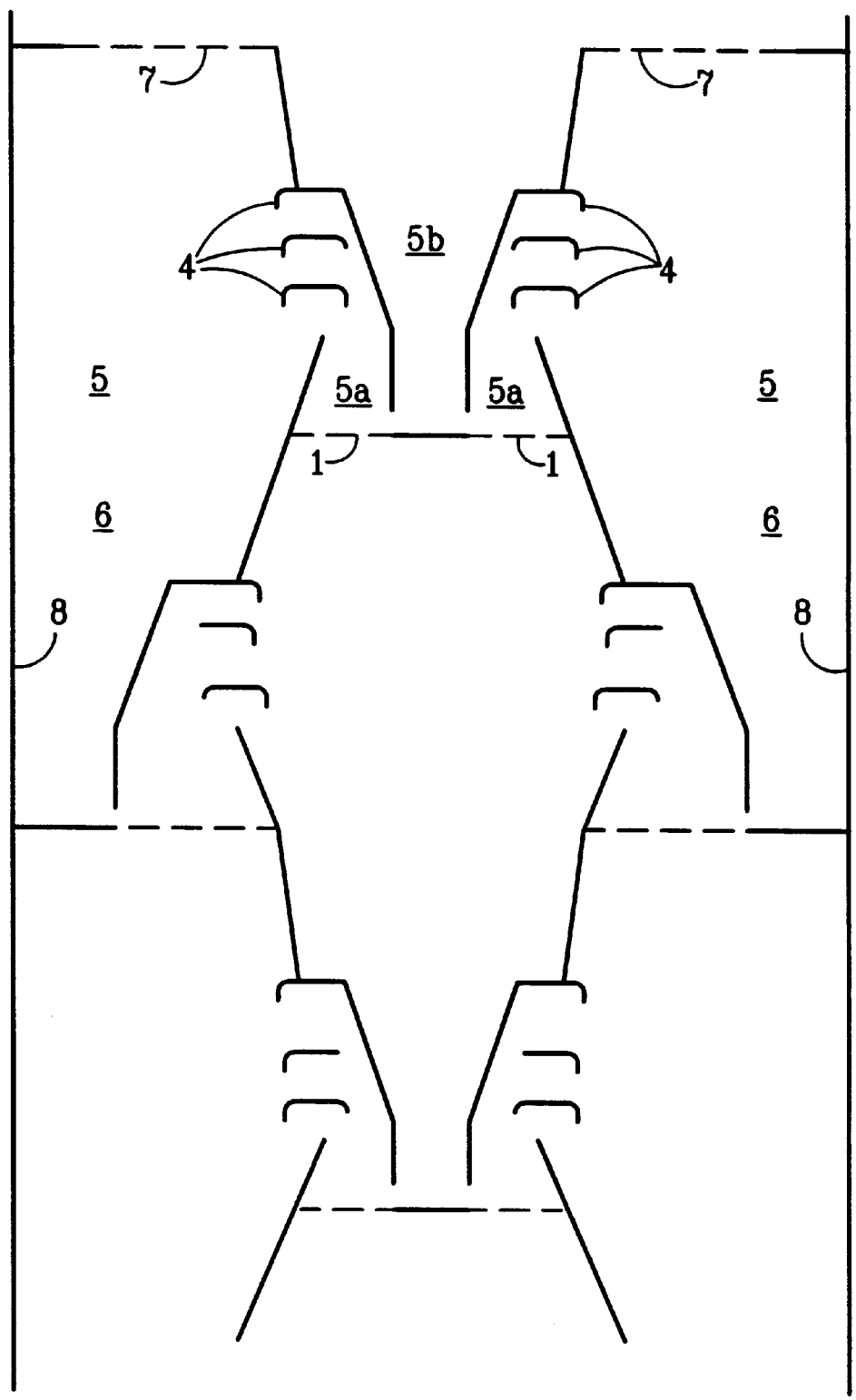
FIG. 3 illustrates the sieve tray of this invention in a multi-pass mode.

The tray design of this invention, and the process steps involving its use, are illustrated in FIG. 2. Vapor entrained with liquid enters the tray through perforated area 1. The impermeable roof 2 above the perforated area prevents the entrained liquid from rising further in the column. The outlet weir 3 (which may be tilted as illustrated in order to maximize the disengaging area), which is adjacent to the perforated area through which vapor travels upward from one tray to another, and baffle 4, deflect vapor and entrained liquid into the disengaging area 5. The downcomer area is labeled 5(*a*), and the engaging area is labeled 5(*b*). De-entrained liquid then moves downward to the tray 6 below, while the vapor moves upward through the perforated area 7 into the tray above.

As FIGS. 2 illustrates, there is little or no direct line of sight from the perforated area of one tray to the perforated area of the next tray in sequence. Less than 50% of the perforated area of each tray is directly in view from the perforated area of the next tray in sequence.

It is strongly preferred that the baffles which are located between the trays have a downwardly curved trailing edge, in order to increase the $C_{flood}$ factor, discussed in the Examples below. Such baffles are referred to here as turning vanes. The trailing edge of the turning vane possesses a shape which approximates a ninety degree arc. This arc has a radius of from one-fourth inch to two inches and preferably from one-half inch to one inch. This shape may be obtained by straight segments or a combination of straight and curved segments.

The disengaging area comprises preferably more than 40%, and more preferably from 45 to 60% of the area of the given "pass" of the tower. Devices such as perforated mesh pads, baffles, louvered plates, and vanes or similar devices may be placed in the disengaging area, especially against the far wall 8, as shown in FIG. 2. When liquid sprays against the far wall, there may be some advantage to mounting these devices in order to keep the liquid from splashing or being blown upward, although satisfactory performance may be obtained without such devices.

The preferred ratio of perforated area at a given tray level to the total cross-sectional area of the tower is 1:10 to 1:2 and most preferably 1:5 to 2:5. This is smaller than the percentage of perforated area usually found in conventional trays. Circular holes are preferred for the perforated areas of this tray, but any shape of hole or slot or any other device, including valves or bubble caps, that allows vapor passage would be acceptable here. In general, the number and size of perforations are chosen to be small enough to avoid excessive weeping of liquid down through the perforations, and large enough to avoid excessive pressure drop. Devices on or above the deck such as vanes, momentum breaker bars or deck orifice shrouds may be used to moderate the liquid momentum and influence the pattern of vapor flow up into the liquid.

Close tray spacing is recommended in for the instant invention. If the tower is operating in a pinched regime (which is common in the target applications for this tray, such as debutanizer bottom sections), then the increased capacity associated with this tray can be used to increase the reflux ratio. In this way the efficiency of the tray may be enhanced.

DATA

EXAMPLE 1

Figure 4:
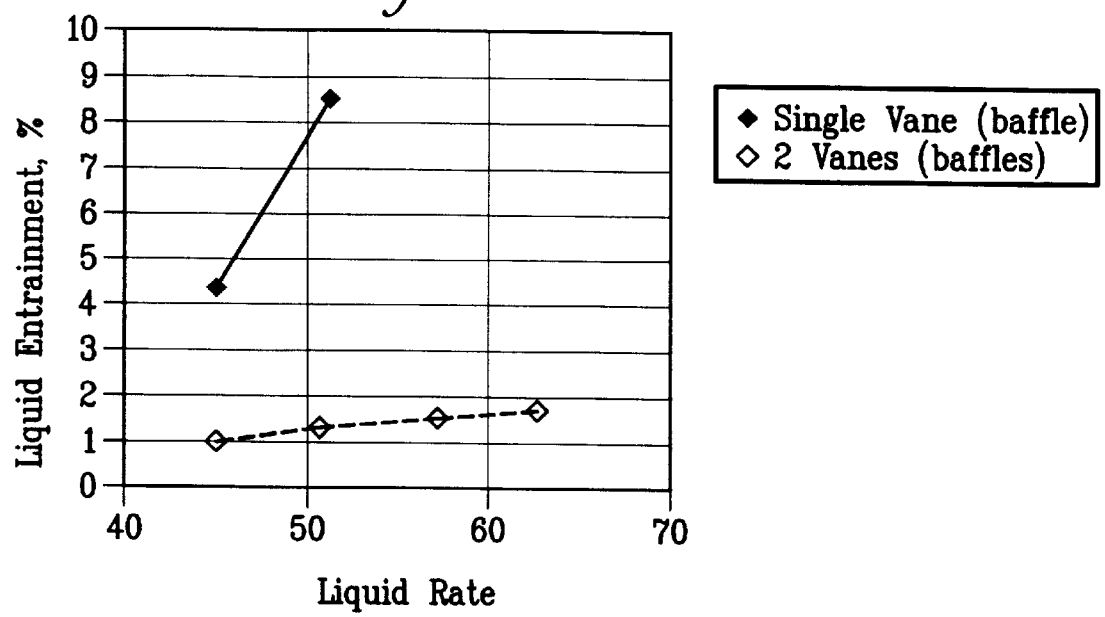
FIG. 4 illustrates the effects of single versus multiple vanes on entrainment of liquid at 500 ft³/min vapor by plotting % liquid entrainment against liquid rate.

FIG. 4 is a plot illustrating the benefit of multiple baffles or vanes which are vertically located between the perforated area and the impermeable roof, as opposed to the single baffle system disclosed in the prior art, in reducing liquid entrainment. An approximately six fold decrease in entrainment (as percentage of liquid feed) is obtained. The Applicants believe the positioning of such baffles to be novel concept.

EXAMPLE 2

The following Example is offered to demonstrate that multiple baffles vertically located between the perforated area and the impermeable roof decrease liquid entrainment dramatically:

An eighteen inch diameter column was used to determine the capacities of trays. Liquid was fed to the top of the tray section and gas was fed to the bottom. Liquid that was entrained upwards from the topmost tray was captured and measured. It is desirable to minimize entrainment. A tray with two baffles unattached to the impermeable roof, such as that shown in FIG. 2, had only 0.33 gallon/minute entrainment, with a liquid feed rate of 90 gpm and a gas rate of 500 SCFM. Another device (not shown) had essentially the same geometry as shown in FIG. 2, except for a single straight baffle protruding downward from the impermeable roof. This device had higher entrainment (1.26 gpm) a the same liquid and gas feed rates, thereby demonstrating improved performance for multiple baffles.

EXAMPLE 3

The instant invention demonstrates the benefit of an increased disengaging area. Disengaging area is defined as the area cross section of the tower defined by:

DA=100−(BA+DBA)

where, DA =disengaging area (or downcomer top area)
BA=bubbling area (perforated area)
DBA=downcomer bottom area

EXAMPLE 4

Figure 5:
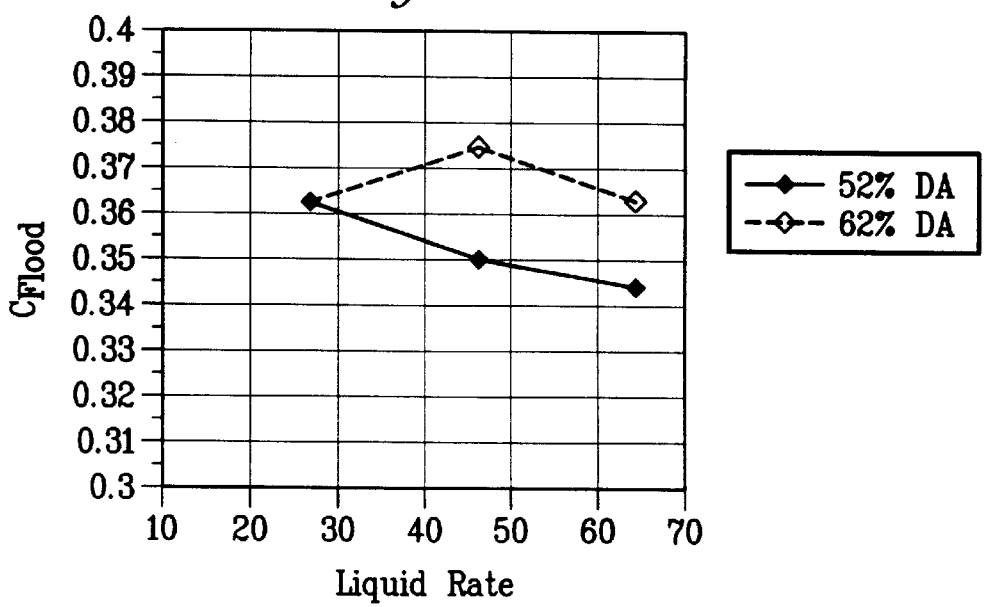
FIG. 5 illustrates the effect of disengaging area size on $C_f$ flooding factor employing straight weirs by plotting $C_f$ flooding factor v. liquid rate.
Figure 6:
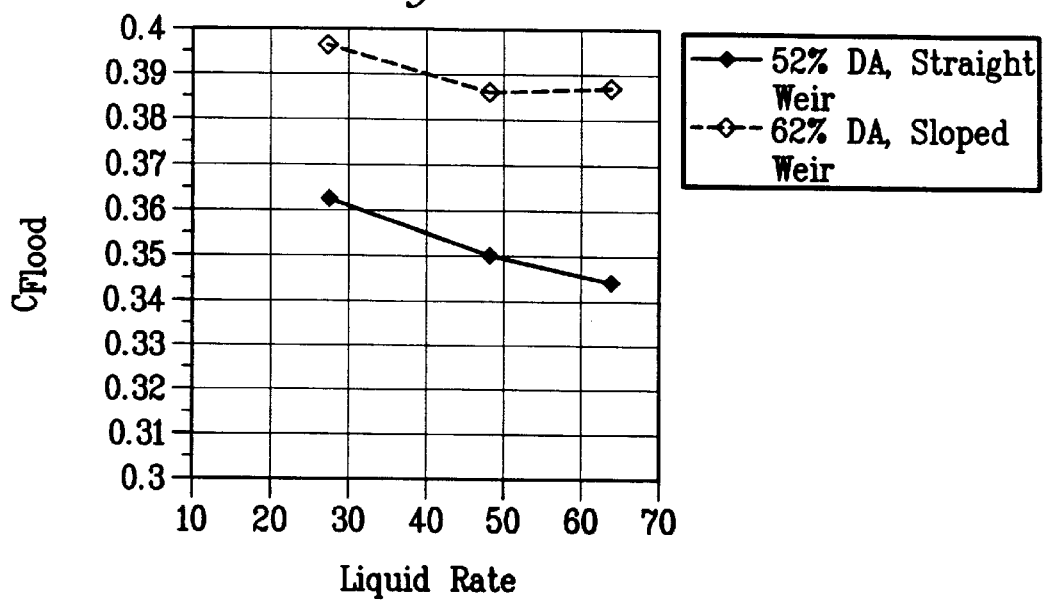
FIG. 6 illustrates the effect of disengaging area size on $C_f$ flooding factor employing straight weirs v. sloped weirs, by plotting $C_f$ flooding factor v. liquid rate.

Disengaging area was increased in the instant invention by reducing bubbling area. This can be accomplished by reducing perforated area or sloping the outlet weir in toward the perforated area. Data supporting our claim to improved performance at larger disengaging area is shown in the attached FIGS. 5 and 6 (below). Flooding $C_{factor}$ or $C_{flood}$ factor, is plotted versus liquid load for data at two different disengaging areas. The higher disengaging area gives the higher $C_{flood}$ values (high $C_{flood}$ value is better) meaning a higher gas rate is needed to flood the device when higher disengaging area is used. FIG. 5 shows the effect for of disengaging area when straight outlet weirs are used and FIG. 6 shows the effect of increased disengaging area brought about by sloping the outlet weir. The preferred value for disengaging area for the instant invention is from 45–70%.

EXAMPLE 5

Figure 7:
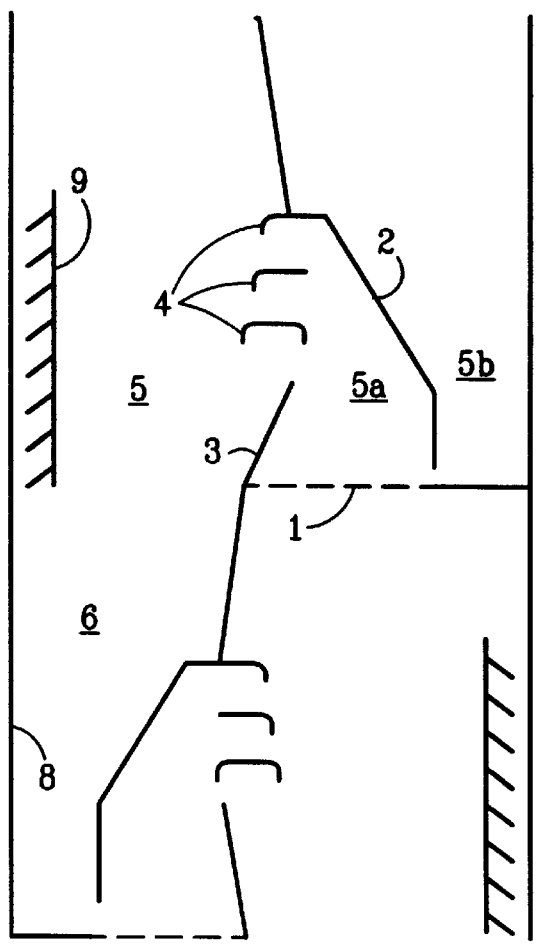
FIG. 7 illustrates the single pass mode of this invention, with louvers opposite the perforated area.
Figure 8:
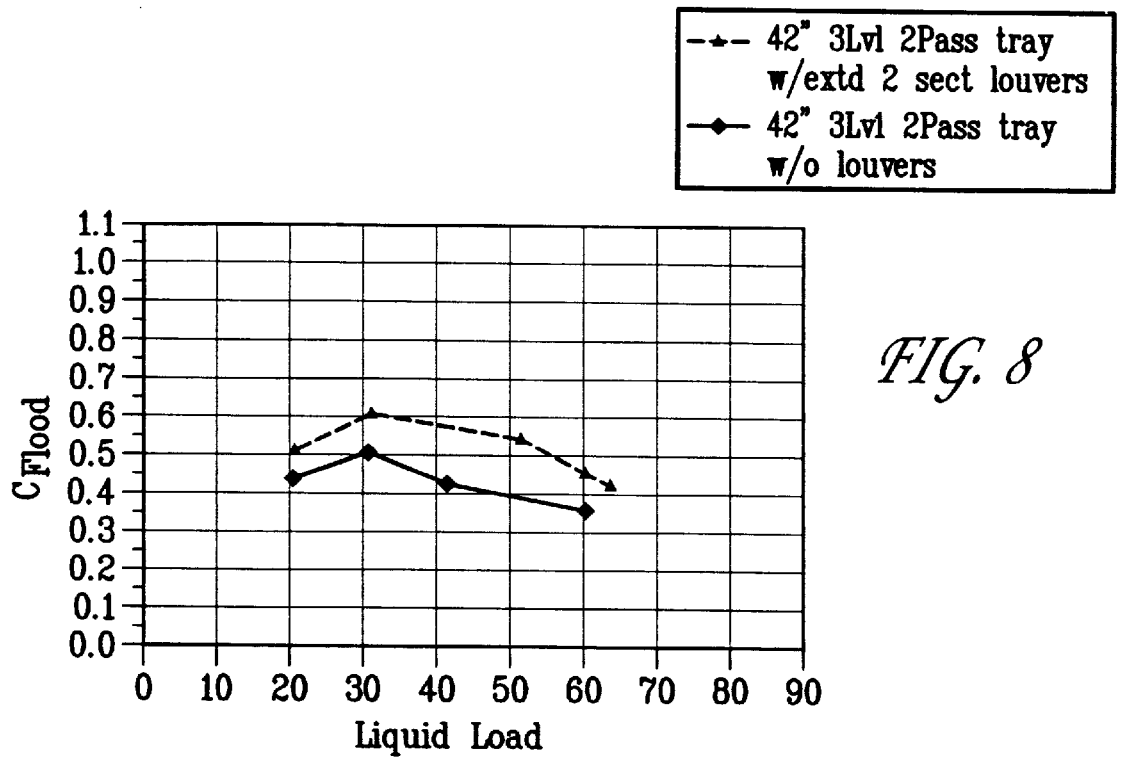
FIG. 8 illustrates tray performance with and without louvers by plotting $C_f$ flooding factor against liquid load.
Figure 9:
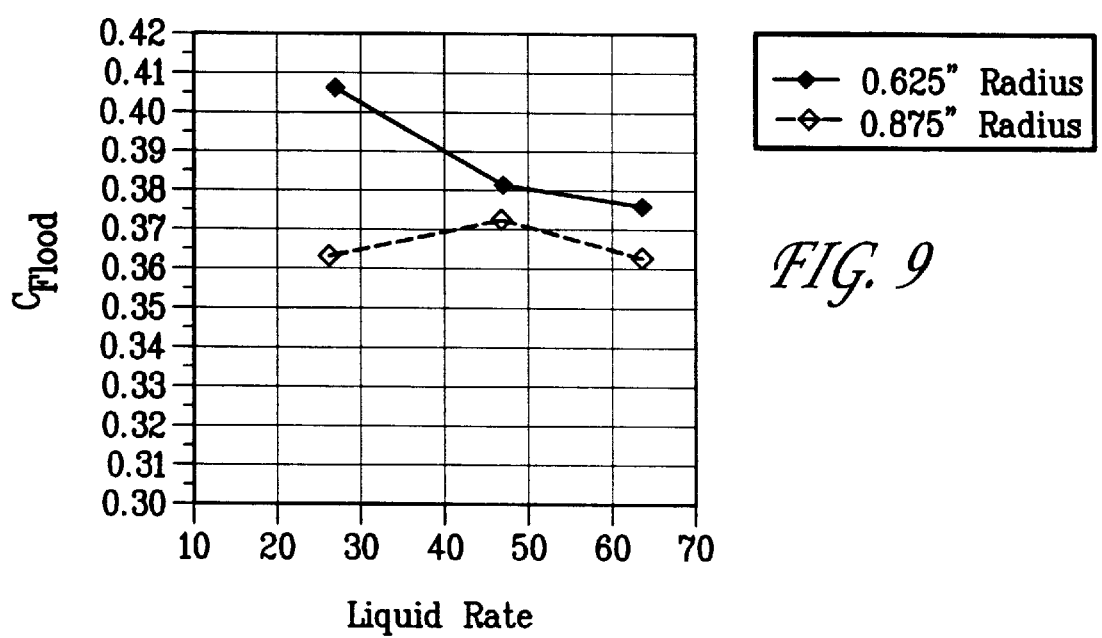
FIG. 9 illustrates the effect of baffle (or vane) radius on $C_f$ flooding factor by plotting $C_f$ flooding factor v. liquid rate.

FIG. 7 illustrates the presence of louvered grates in a single pass application in the disengaging area opposite the perforated area, in order to further enhance disengagement of liquid from vapor. FIG. 8 demonstates the performance improvement (higher $C_{flood}$) when the louvers are used compared to without the louvers.

We claim:

1. A separation process which employs a series of trays arranged in a sequence with a tray above another, each tray comprising at least one perforated area through which vapor comprising entrained liquid travels upward from one tray to another, wherein said perforated area of each tray is covered by an impermeable roof in order to inhibit the rise of entrained liquid, each tray further comprising at least one outlet weir which is adjacent to the perforated area, and wherein at least one tray of the series further comprises at least two baffles, each of which is vertically located between the perforated area and the impermeable roof but is not attached to either, one baffle being a topmost baffle and other baffle or baffles being located vertically below the topmost baffle, wherein all baffles aid in the deflection of vapor and entrained liquid to a disengaging area between the trays, where vapor is separated from liquid, the vapor moving upward and the liquid falling downward.

2. The process of claim 1, wherein at least one baffle is located between each tray and the next upward tray in the sequence.

3. The process of claim 2, wherein each baffle possesses a curved trailing edge having a shape approximating a ninety degree arc, said arc having a radius of from one-fourth inch to two inches, thereby increasing $C_{flood}$ value.

4. The process of claim 3, wherein said arc has a radius of from one-half inch to one inch.

5. The process of claim 1, in which the preferred ratio of perforated area at a given tray level to the total cross-sectional area of the tower is from 1:10 to 1:2, thereby optimizing $C_{flood}$ value.

6. The process of claim 1, in which the preferred ratio of perforated area at a given tray level to the total cross sectional area of the tower is from 1:5 to 2:5, thereby further optimizing $C_{flood}$ value.

7. The process of claim 1, in which perforations of the perforated area are circular.

8. The process of claim 1, in which vanes or mesh devices are mounted within the disengaging zone in order to prevent liquid from splashing upward.

9. The process of claim 1, wherein louvered grates are present in the disengaging area opposite the perforated area, in order to further enhance disengagement of liquid from vapor.

10. A vapor/liquid contacting device comprising a series of trays arranged in a sequence with one tray above another, each tray comprising at least one perforated area through which vapor comprising entrained liquid travels upward from one tray to another tray above it, wherein said perforated area of each tray is covered by an impermeable roof in order to inhibit the rise of entrained liquid, each tray further comprising at least one outlet weir which is adjacent to the perforated area, and wherein at least one tray of the series further comprises at least two baffles, each of which is vertically located between the perforated area and the impermeable roof but is not attached to either, one baffle being a topmost baffle and other baffle or baffles being located vertically below it, wherein all baffles aid in the deflection of vapor and entrained liquid to a disengaging area between the trays, where vapor is separated from liquid, the vapor moving upward and the liquid falling downward.

* * * * *